(12) United States Patent
Suzuki

(10) Patent No.: US 6,334,828 B1
(45) Date of Patent: Jan. 1, 2002

(54) POWER TRANSMITTING SILENT CHAIN APPARATUS

(75) Inventor: Kenshi Suzuki, Osaka (JP)

(73) Assignee: Tsubakimoto Chain, CO, Osaka (JP)

( * ) Notice: Subject to any disclaimer, the term of this patent is extended or adjusted under 35 U.S.C. 154(b) by 0 days.

(21) Appl. No.: 09/505,286

(22) Filed: Feb. 16, 2000

(30) Foreign Application Priority Data

Feb. 16, 1999 (JP) .......................................... 11-037745

(51) Int. Cl.[7] .............................................. F16G 13/02
(52) U.S. Cl. ........................ 474/212; 474/226; 474/233
(58) Field of Search ................................ 474/212, 213, 474/214, 215, 216, 217, 226, 233

(56) References Cited

U.S. PATENT DOCUMENTS

| 4,915,676 | A | * | 4/1990 | Komeya ..................... 474/213 |
| 5,267,910 | A | * | 12/1993 | Maruyama et al. ......... 474/212 |
| 5,419,743 | A | * | 5/1995 | Takeda et al. .......... 474/210 X |
| 5,628,702 | A |   | 5/1997 | Kotera |
| 5,651,746 | A | * | 7/1997 | Okuda ........................ 474/215 |
| 5,758,484 | A | * | 6/1998 | Ledvina et al. ......... 474/213 X |
| 5,803,854 | A | * | 9/1998 | Tada et al. ................. 474/213 |

OTHER PUBLICATIONS

British Search Report dated Jun. 16, 2000.

\* cited by examiner

Primary Examiner—Charles A Marmor
Assistant Examiner—Ha Ho
(74) Attorney, Agent, or Firm—Armstrong, Westerman, Hattori, McLeland & Naughton, LLP

(57) ABSTRACT

A power transmitting silent chain apparatus comprises a silent chain and a sprocket. The silent chain is comprised of a plurality of link plates interconnected by connector pins. Each link plate has a pair of teeth. The sprocket has a plurality of involute teeth for meshing with the link plate teeth. The link plate teeth have inner and outer flanks profiled to satisfy the expression $Hi=Ho+Hs$, where $Hi$ is a distance from a pitch line of the chain to a pitch line of the inner flanks, $Ho$ is a distance from the chain pitch line to a pitch line of the outer flanks, and $Hs$ is an amplitude of a polygonal motion of the chain.

4 Claims, 9 Drawing Sheets

POWER TRANSMITTING SILENT CHAIN APPARATUS

BACKGROUND OF THE INVENTION

1. Field of the Invention

The present invention relates to an improvement in a power transmitting silent chain apparatus for use as a timing chain for power transmission in an automobile, a power transmitting chain in an industrial machine or the like.

2. Description of the Related Art

In a conventional power transmitting silent chain apparatus, a silent chain comprises a plurality of link plates each having a pair of teeth profiled as shown in FIG. 5 hereof so that it starts meshing with a sprocket at outer flanks 15 forming outer sides of the link teeth 14. Inner flanks 16 forming inner sides of the link teeth 14 are provided to extend deeper inward than an imaginary profile symmetrical with the outer flanks 15 forming the outer sides of the link teeth 14 so that they do not interfere with involute teeth of the sprocket during meshing of the chain with the sprocket.

Consequently, as shown in FIG. 5, an inner flank pitch line PL2, passing parallel to a chain pitch line PL1 (line passing over the centers of apertures 12 of the link plate 13) over the inner flanks 16 at points where the distance between the points becomes ½ of a chain pitch P (distance between the centers of the link apertures 12), is positioned closer to the chain pitch line PL1 than an outer flank pitch line PL3, passing parallel to the chain pitch line PL1 over the outer flanks 15 at points where the distance between those points becomes ½ of the chain pitch P. That is, the profiles of the teeth of the link plate 13 are Hi≦Ho, where Hi is a distance from the chain pitch line PL1 to the inner flank pitch line PL2, and Ho is a distance from the chain pitch line to the outer flank pitch line PL3.

Referring next to FIG. 6, the sprocket 11 has involute teeth for meshing with the silent chain. These teeth are formed by an ordinary sprocket teeth hobbing process in which a hob cutter with teeth 17 profiled correspondingly to the outer configurations of the outer flanks is used to cut a peripheral portion of the sprocket by an amount of addendum modification Hf between a gear cutting center line (tangential to a pitch radius of the sprocket) and a hob center line (tangential to an intermeshing radius of the sprocket).

It has been known that when the silent chain comprising the link plates arranged as shown in FIG. 5 is placed in meshing engagement with the sprocket having the involute teeth arranged as explained above, the silent chain is wound around the sprocket in a polygonal fashion and practically used in this manner.

However, since the link plates of the above silent chain mesh at their outer flanks alone with the involute teeth of the sprocket, the silent chain makes, upon commencement of meshing, a polygonal motion involving up and down movements radial of the sprocket.

Then, a quantitative analysis was made on the polygonal motion. As can be appreciated from FIG. 7, since a pitch angle α of the silent chain and the number of teeth N of the sprocket 11 have relations expressed by α=(360°/N), the followings may be established.

First, when the chain pitch is P and a free span of the chain following the link 13b is positioned at a right angle to a line passing over the centers of the sprocket 11 and a pin 12a, the distance from the center of the sprocket 11 to the pin 12a of the chain free span is expressed by U=P/2 sin(α/2). The term "free span of the chain" used herein represents a chain portion not completely engaged with the sprocket but being in progress of engaging with the sprocket. In other words, the chain free span is a chain portion not completely restrained by the sprocket and is thus placed in a relatively free state.

Next, as shown in FIG. 8, when the sprocket 11 is rotated a half pitch angle α/2 and the chain free span is positioned at a right angle to a line passing over the centers of the sprocket 11 and the link 13b, the distance from the center of the sprocket 11 to the chain pitch line PL1 of the chain free span is expressed by V=P/2 tan(α/2).

As can be readily appreciated from the above discussion, the silent chain just started meshing engagement with the sprocket 11 makes a polygonal motion of Amplitude Hs=U−V involving up and down movements during half pitch angle (α/2) rotation of the sprocket 11.

Consequently, in the thus-arranged conventional power transmitting silent chain apparatus, the polygonal motion of Amplitude Hs=U−V and associated up and down movements cause the link plates 13a, 13b, 13c to hit the involute teeth of the sprocket 11, resulting in an undesired beating motion. In addition, when the silent chain apparatus is operated at a high speed, undesired vibratory and impact sounds are produced at the start of meshing of the silent chain with the sprocket. Further, impact of the silent chain against the sprocket shortens the lives of the chain and the sprocket. Moreover, the polygonal motion causes the tension of the chain to change, thereby further decreasing the durability of the silent chain.

SUMMARY OF THE INVENTION

It is therefore an object of the present invention to provide a power transmitting silent chain apparatus in which vibratory sounds and impact sounds produced by up and down movements involved in the polygonal motion of the silent chain are reduced and the changes in the chain tension are alleviated, and in which the silent chain and sprocket have increased durability.

To attain the above object, there is provided, in accordance with the present invention, a power transmitting silent chain apparatus which comprises: a silent chain comprised of a plurality of link plates interconnected by connector pins, each link plate having a pair of teeth; and a sprocket having a plurality of involute teeth for meshing with the link plate teeth, the link plate teeth having inner and outer flanks profiled to satisfy the expression $$Hi=Ho+Hs$$

where Hi is a distance from a pitch line of the chain to a pitch line of the inner flanks, Ho is a distance from the chain pitch line to a pitch line of the outer flanks, and Hs is an amplitude of a polygonal motion of the chain.

In the thus-arranged silent chain apparatus, the distance from the center of the sprocket to a free span of the chain is kept constant throughout the course of meshing of a link plate immediately before the chain free span, that is, from the start of meshing until seating on the sprocket of that link plate, thereby preventing the silent chain from making vertical movements resulting from the polygonal motion of the chain. This leads to the further advantage that vibratory sounds and impact sounds produced upon meshing of the chain with the sprocket can be alleviated and hence the silent chain apparatus is imparted with increased durability.

Preferably, engaging or bearing surfaces of the link plates are processed by shaving or fine-blanking so that they have a shear plane length of more than 70% of the thickness of the link plate. As a result, it becomes possible to reduce impact sounds produced upon meshing of the chain with the sprocket and wear of the sprocket teeth. This further prolongs the lives of the chain and sprocket and prevents stiffening of the chain links.

Each of the connector pins may comprise either a round pin or a locker pin.

BRIEF DESCRIPTION OF THE DRAWINGS

A preferred embodiment of the present invention will hereinafter be described in detail, by way of ample only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
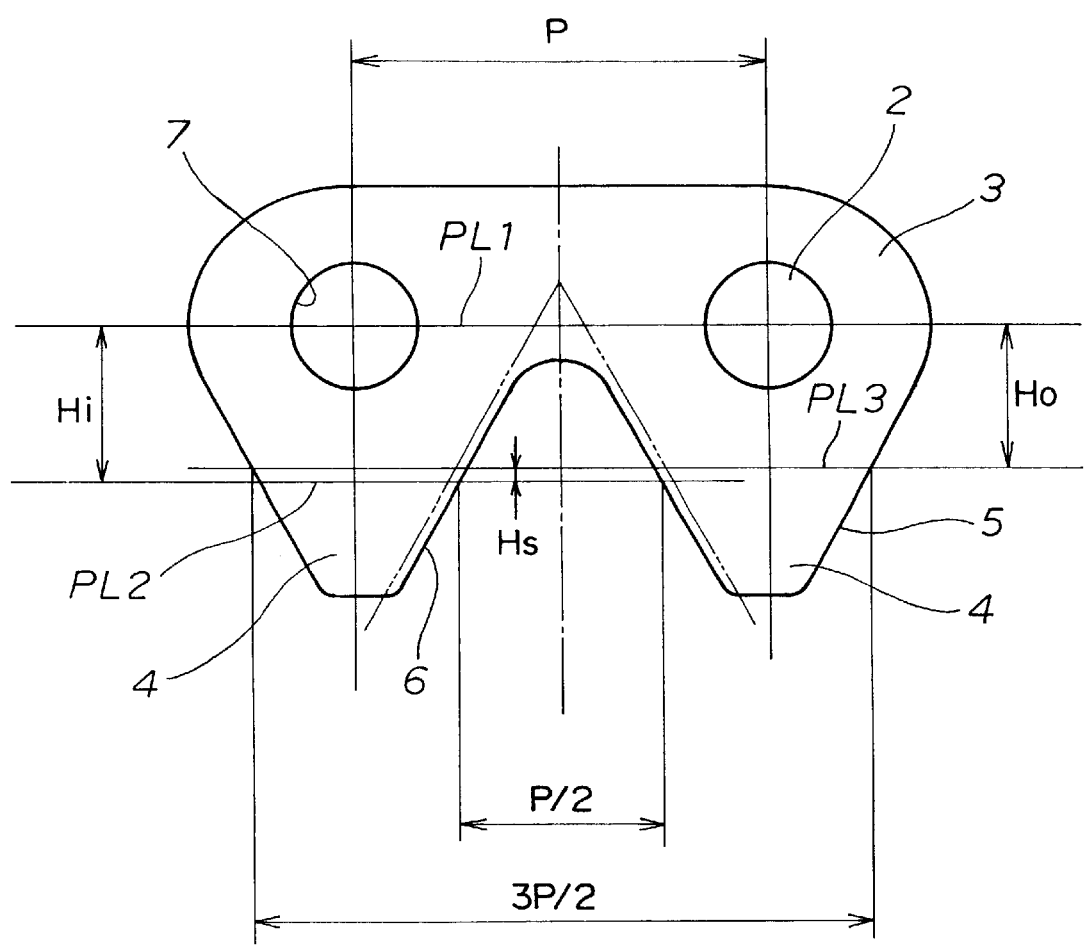
FIG. 1 is a view schematically showing a link plate of a silent chain employed in a power transmitting silent chain apparatus according to the present invention.
Figure 2:
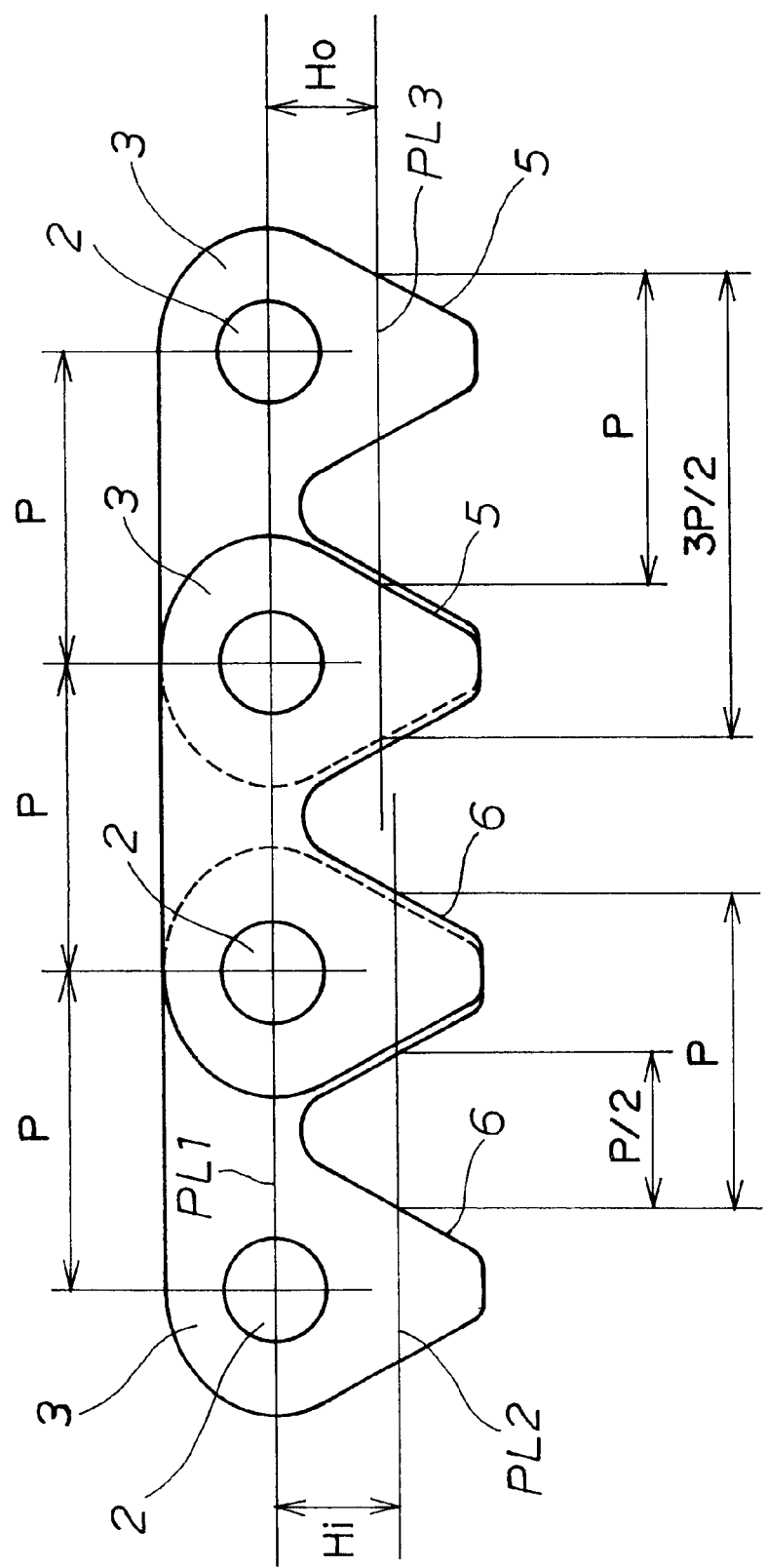
FIG. 2 is a view schematically illustrative of the arrangement of the silent chain.
Figure 3:
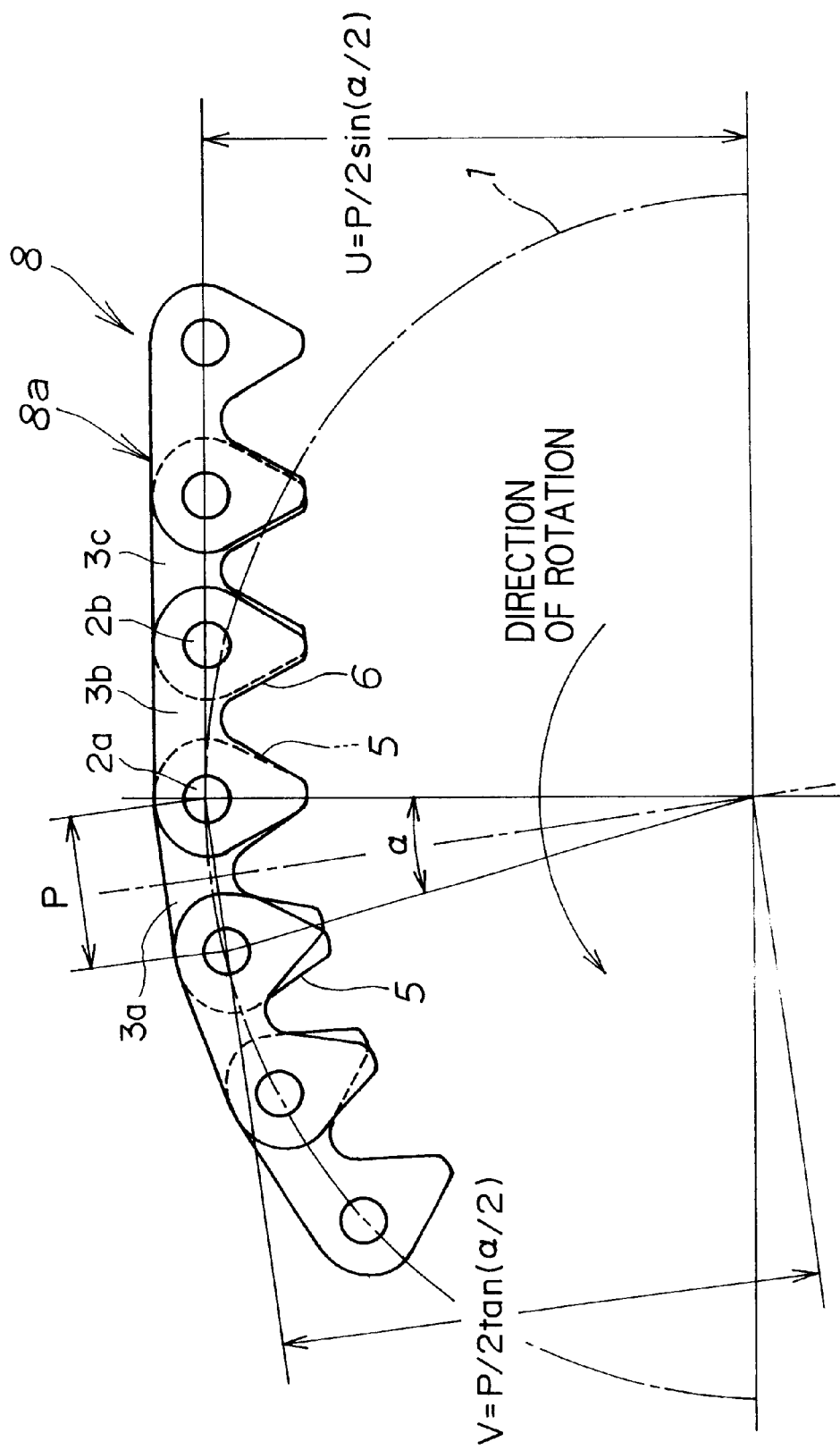
FIG. 3 is a view schematically illustrative of the manner in which the silent chain meshes with a sprocket according to the present invention.

Referring to FIGS. 1 to 3, a power transmitting silent chain apparatus according to the present invention comprises a silent chain 8 and a sprocket 1 (bosh shown in FIG. 3).

The silent chain 8 comprises a plurality of link plates 3 interconnected by means of connector pins 2 fitted in apertures 7 formed therein. Each link plate 3 has a pair of teeth 4, outer flanks 5 forming the outer sides thereof, and inner flanks 6 forming the inner sides thereof.

The sprocket 1 has involute teeth, which are ordinary ones and hence not shown, for meshing with the teeth 4 of the link plate 3.

The flanks 5, 6 forming the teeth of the link plates 3 are profiled to satisfy the expression $$Hi=Ho+Hs$$

where Hi is the distance from a chain pitch line PL1 to an inner flank pitch line PL2, Ho is the distance from the chain pitch line PL1 to an outer flank pitch line PL3, and Hs is an amplitude of the polygonal motion of the chain 8.

The term "chain pitch line" used herein represents a pin-to-pin distance of a link plate 3. The term "inner flank pitch line" used herein represents a line passing parallel to the chain pitch line PL1 over the inner flanks 6 at points where the distance between the points becomes ½ of the chain pitch P. The term "outer flank pitch line" used herein represents a line passing parallel to the chain pitch line PL1 over the outer flanks 5 at points where the distance between those points becomes 3⁄2 of the chain pitch P. The term "amplitude of polygonal motion" used herein represents a distance of up and down movements radial of the sprocket 1, which the silent chain 8 makes when the chain starts meshing at its outer flanks 5 alone with the sprocket 1.

The link plates 3 employed in the silent chain 8 of the embodiment described herein have identical profiles. Thus, as shown in FIG. 2, the distance between the inner flank 6 of one link plate 3 and the corresponding inner flank 6 of an adjacent link plate 3 is equal to the pin-to-pin pitch P of the link plates 3. Similarly, the distance between the outer flank 5 of one link plate 3 and the corresponding outer flank 5 of an adjacent link plate 3 is equal to the pin-to-pin pitch P of the link plates.

Discussion will be made next as to an operation of the power transmitting silent chain apparatus with reference to FIGS. 3 and 4.

As shown in FIG. 3, the chain 8 is engaged with the sprocket 1 such that the pin 2a and a succeeding free span 8a of the chain 8 are right-angled with respect to a line passing over the center of the sprocket 1 and the pin 2a. The term "free span of the chain" used herein represents that part of the silent chain 8 which is about to get engaged with the sprocket 1 and is not yet seated on the latter. In this sense, the free span of the chain is not completely restrained by the sprocket 1 and is kept relatively free.

Figure 7:
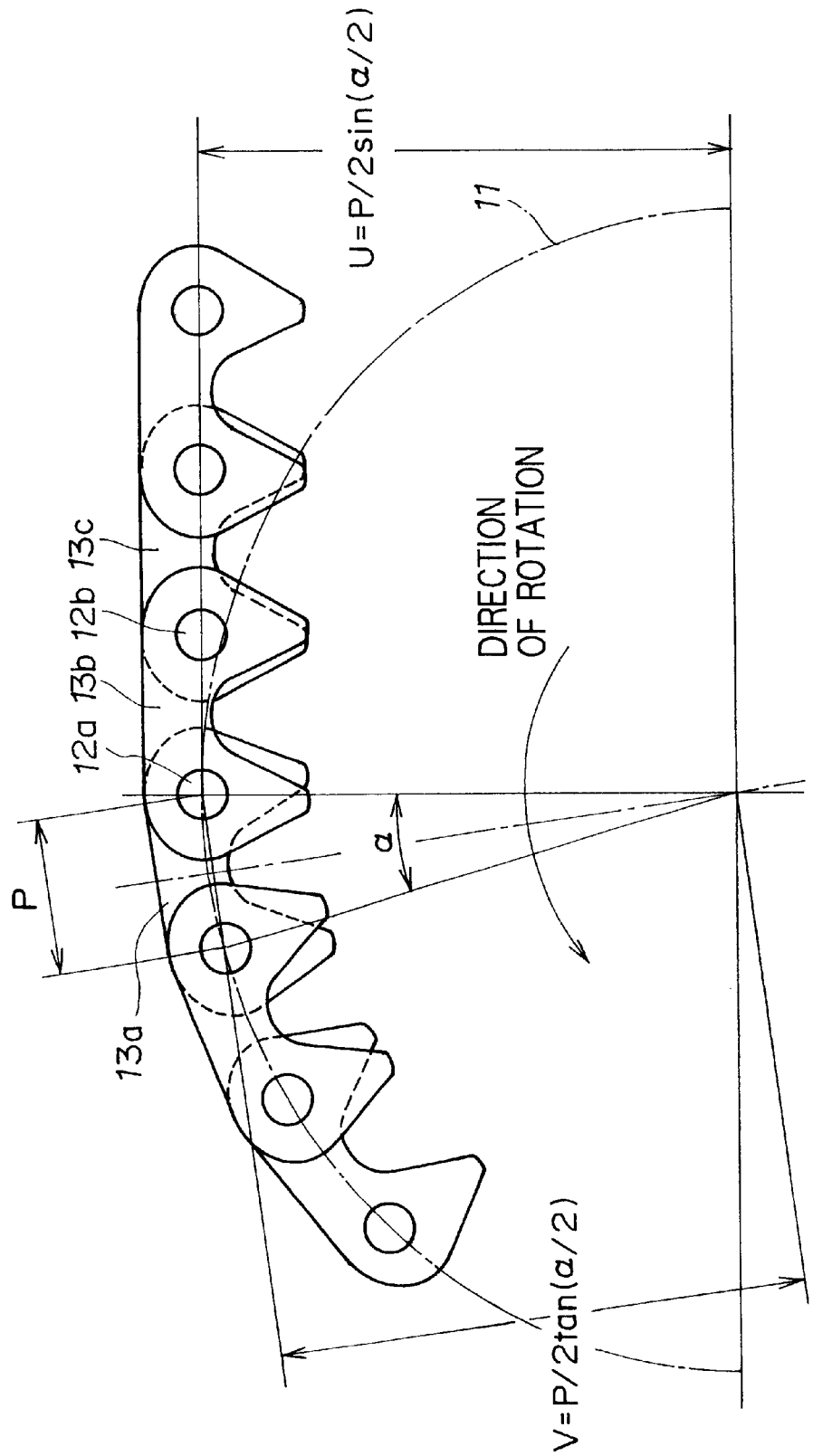
FIG. 7 is a schematic view illustrative of a meshing state in the conventional silent chain apparatus.

The link plate 3a meshes at its opposed outer flanks 5 with the sprocket 1 and seated on the latter as in the conventional arrangement of FIG. 7. Thus, the distance from the center of the sprocket 1 to the chain pitch line PL1 passing over the link plates of the chain free span 8a is expressed by $$U=P/2\ \sin(\alpha/2).$$

However, the distance from the center of the sprocket 1 to the chain pitch line PL1 of the link plate 3b of the chain free span 8a can not be determined in a similar manner as in the case of the pin 2a, because the link plate 3b engages with the sprocket 1 at its advance-direction-side inner flank 6.

The chain free span 8a including the link plate 3b and succeeding ones is pulled taut linearly by the tension of the silent chain 8, as shown in FIG. 3. At this time, the inner flank projects farther outward than an imaginary profile symmetrical with the outer flank profile. Thus, when the sprocket 1 is assumed to be a pinion, the chain free span may be deemed a rack having teeth of trapezoidal profile formed by a multitude of inner flanks. In this sense, the chain free span 8a and the sprocket 1 have meshing relations as found in ordinary rack-and-pinion mechanisms.

The link plate 3b meshes at its advance-direction-side inner flank 6 with the sprocket 1. The inner flank pitch line PL2 is positioned farther from the chain pitch line PL1 than the outer flank pitch line PL3 by the distance Hs (see FIG. 1). Thus, the distance from the center of the sprocket 1 to the chain pitch line PL1 of the link plate 3b of the chain free span 8a is obtained by the expression:

$$V+Hs=U.$$

Figure 4:
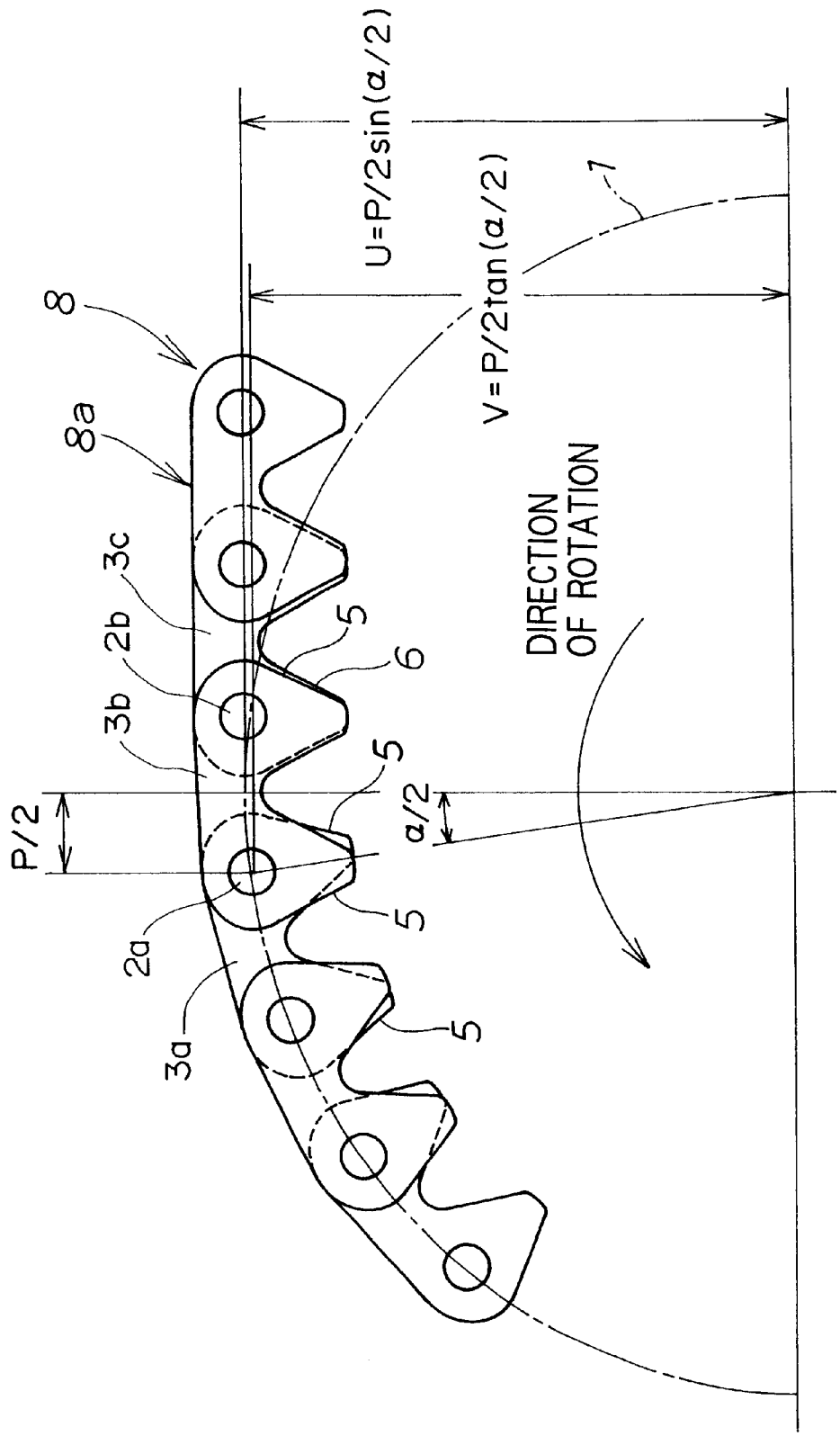
FIG. 4 is a view schematically illustrating a meshing state in which the sprocket is rotated a half pitch angle ($\alpha/2$) from the position of FIG. 3.
Figure 5:
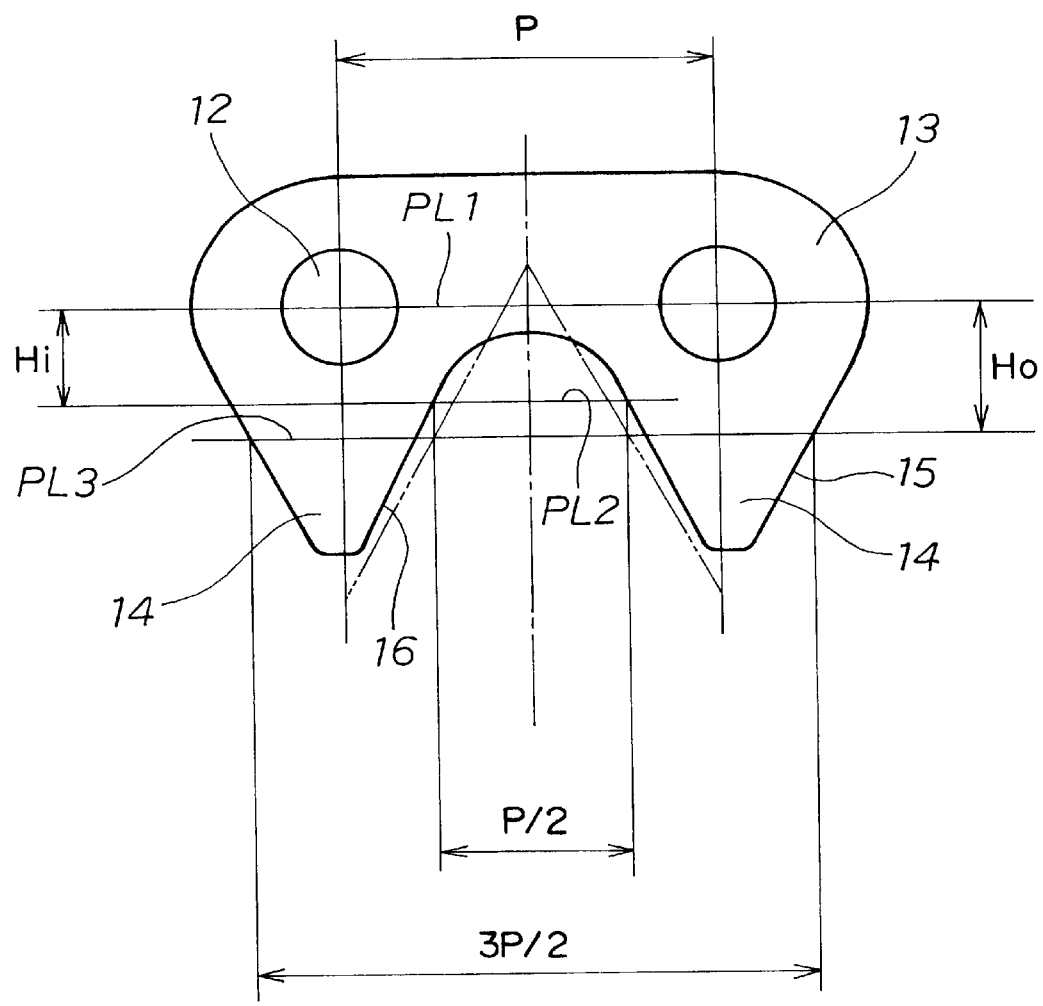
FIG. 5 is a schematic view showing a link plate of a silent chain employed in a conventional power transmitting silent chain apparatus.
Figure 6:
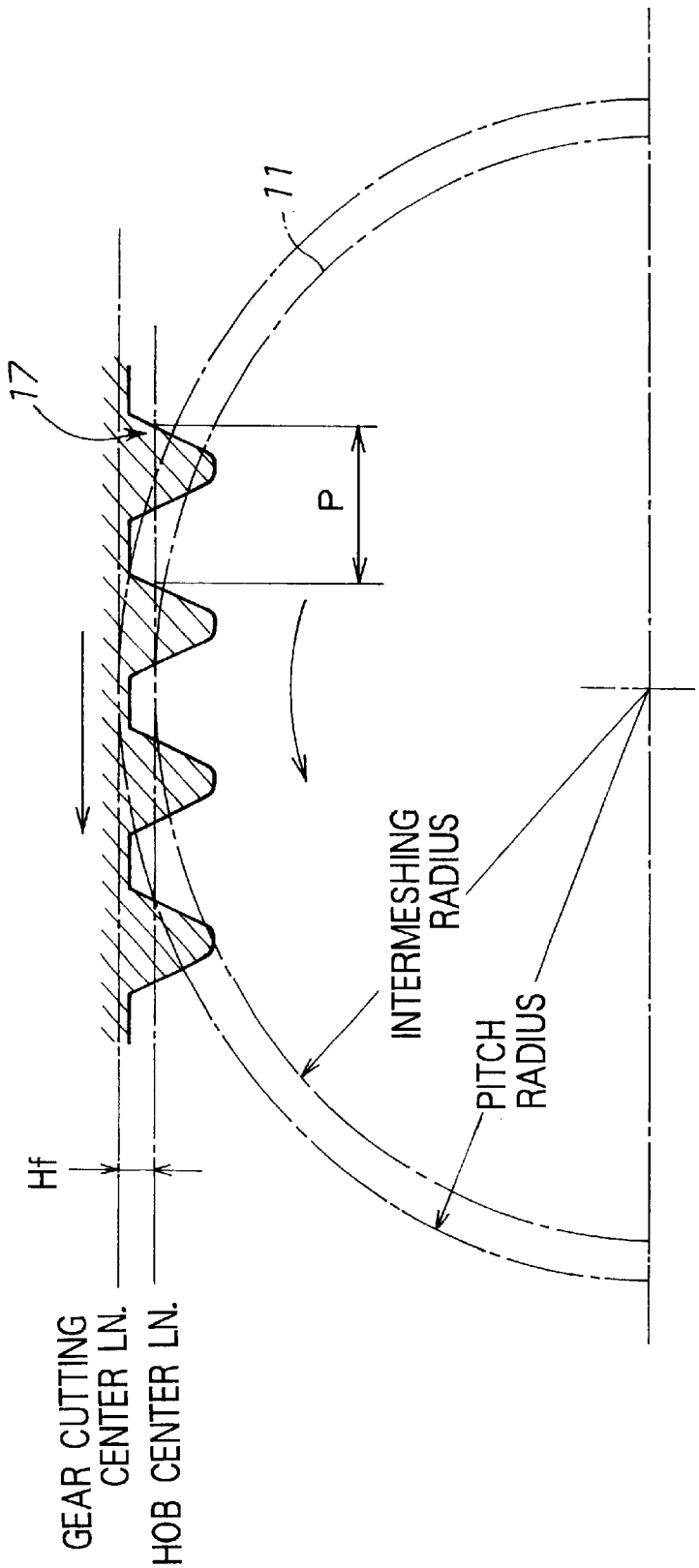
FIG. 6 is a schematic view showing a conventional hobbing process in which involute teeth of the sprocket are formed.
Figure 8:
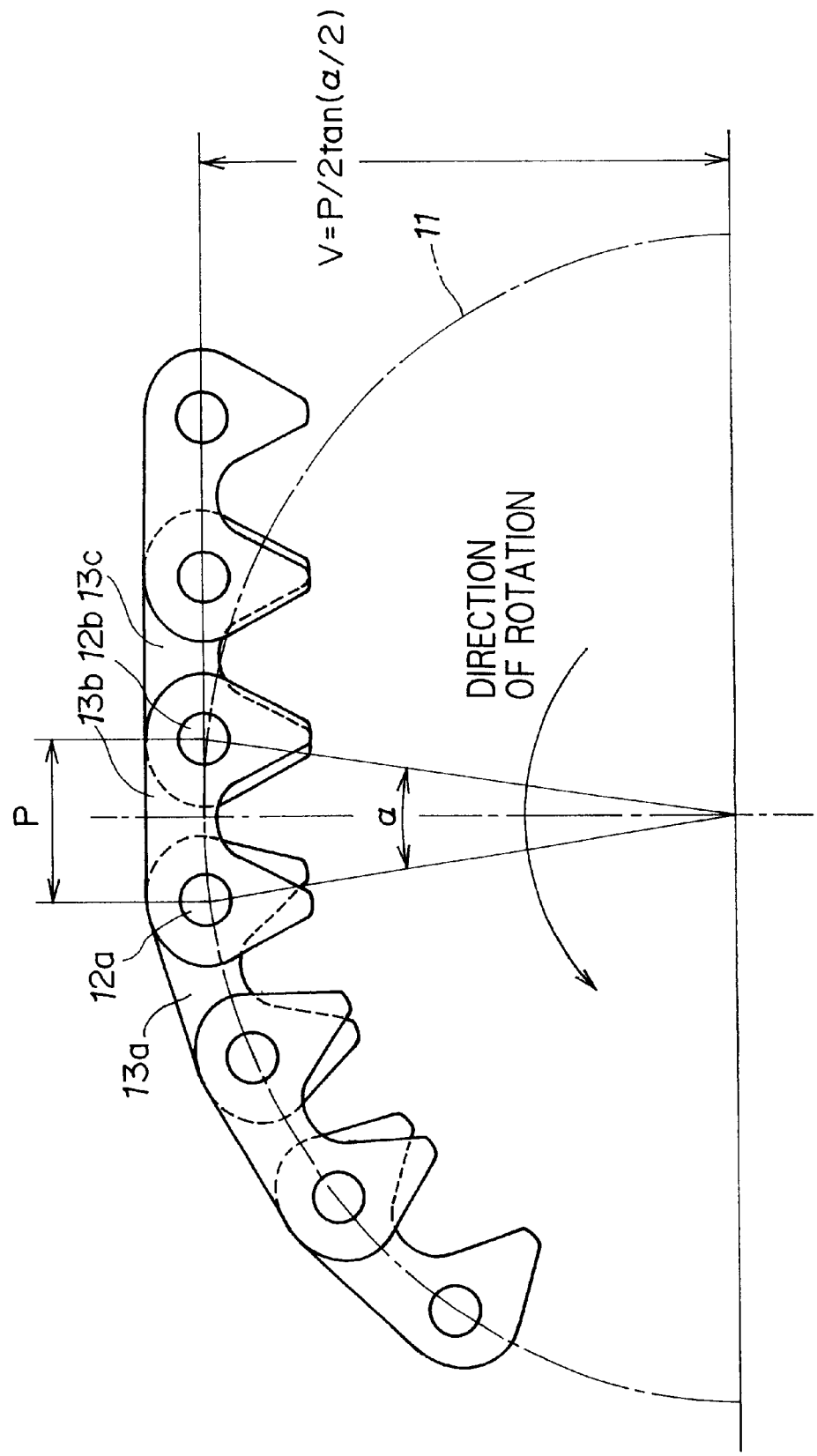
FIG. 8 is a schematic view illustrative of a meshing state in which the conventional sprocket is rotated a half pitch angle ($\alpha/2$) from the position of FIG. 7.
Figure 9:
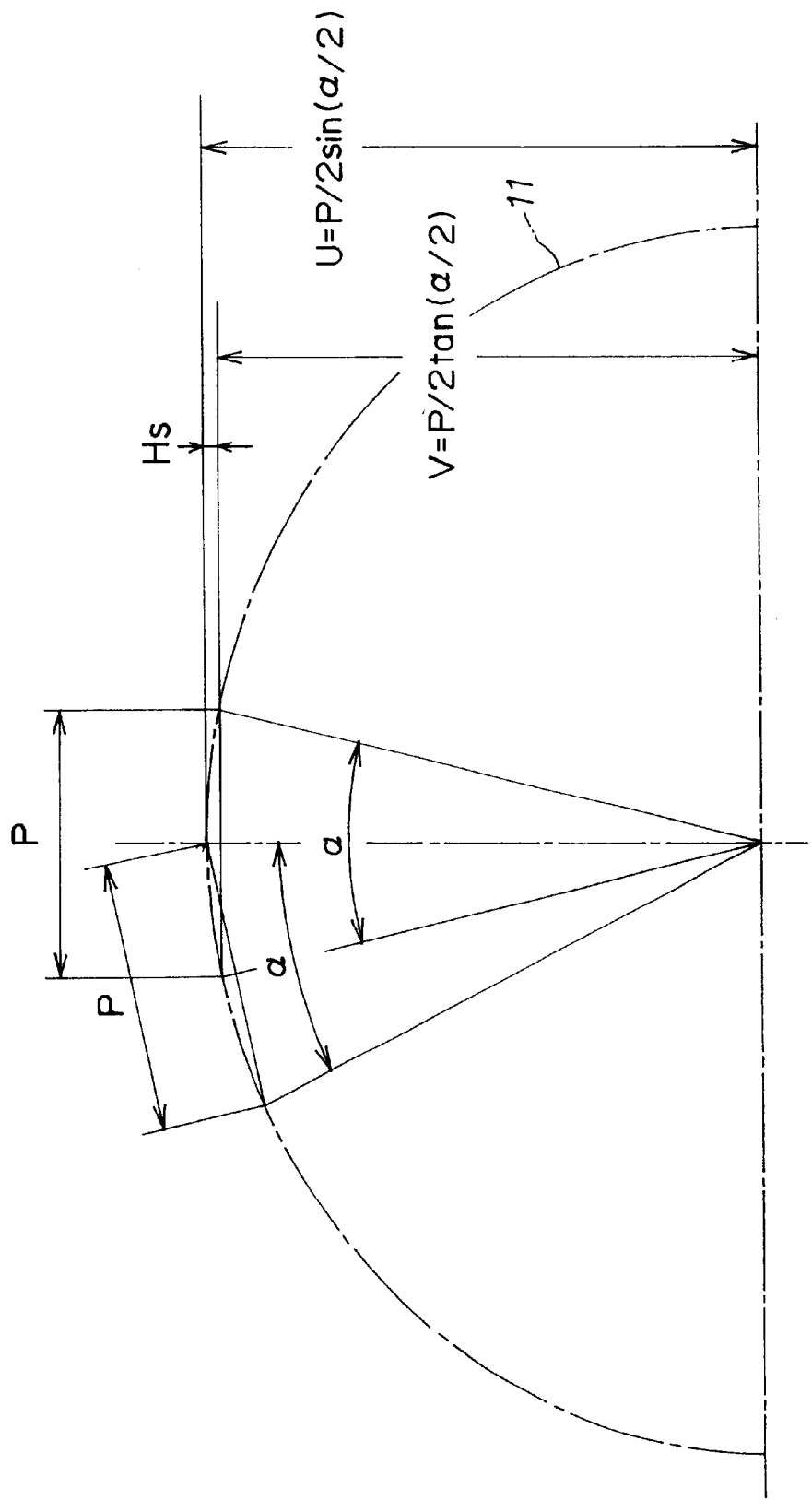
FIG. 9 is a view schematically illustrating a polygonal motion of the silent chain occurring in the conventional apparatus.

Reference is made next to FIG. 4 illustrating how the silent chain 8 meshes with the sprocket 1 after the silent chain advanced a half pitch and the sprocket turned a half pitch angle α/2. The link plate 3a is engaged at its opposite outer flanks 5 with the sprocket 1 and seated on the latter as in the conventional arrangement of FIG. 8. Thus, the distance from the center of the sprocket 1 to the pin 2a is expressed by $$V=P/2\ \tan(\alpha/2).$$

Link plate 3c meshes at its advance-direction-side inner flank 6 with the sprocket 1, whilst the inner flank pitch line is Hi =Ho+Hs. This makes the meshing height V larger by Hs than in the case of the conventional chain shown in FIG. 8. Consequently, the distance from the center of the sprocket 1 to the pin 2b is expressed by $$U=P/2\sin(\alpha/2).$$

Turning back to FIG. 3, this means that the height to the link plate 3c is kept constantly at U during a period from the start of meshing of the inner flank 6 of the link plate 3c with the sprocket 1 until advancement of the pin 2b to a position where the pin 2a was.

At that time, the inner flank 6 of the link plate 3b separates from the sprocket 1 due to the winding or bending action of the chain about the pin 2a, whilst the link plate 3b is supported by the pins 2a, 2b and smoothly brought into fuller meshing engagement with the sprocket 1. In contrast, the outer flank 5 of the link plate 3b is kept out of contact with the sprocket 1 due to its relation of $$Hi=Ho+Hs.$$

Consequently, the chain free span 8a is constantly kept at the height of U throughout the course of engagement of the silent chain 8 with the sprocket 1 and hence does not make up and down movements upon the polygonal motion of the chain.

As can be readily appreciated by those skilled in the art, the chain polygonal motion becomes zero when the link plates 3 in which the inner flanks 6 are profiled such that the inner flank pitch line PL2 is positioned farther from the chain pitch line PL1 than the outer flank pitch line PL3 by a distance corresponding to the amplitude Hs of the chain polygonal motion are brought into meshing engagement with the involute-toothed sprocket 1.

Unlike the conventional silent chain apparatus comprising the link plates each having the relation of Hi≦Ho as explained in relation to FIG. 7, the power transmitting silent chain apparatus of the embodiment described above is designed so that the distance from the center of the sprocket 1 to the chain free span 8a is kept at a constant value of U throughout the course of meshing of the link plate immediately before the chain free span, that is, from the start of meshing until seating on the sprocket of that link plate, thereby preventing the silent chain from making vertical movements resulting from the polygonal motion of the chain. This leads to the further advantage that vibratory sounds and impact sounds produced upon meshing of the chain with the sprocket can be alleviated.

Each of link plate employed in the silent chain apparatus of the embodiment described herein is processed by shaving or fine-blanking so that its engaging surface has a shear plane length of more than 70% of the thickness of the link plate, thereby reducing wear of the sprocket teeth surfaces and preventing the silent chain from becoming stiff. In addition, this further reduces the vibratory sounds and impact sounds generated upon meshing of the chain with the sprocket.

Obviously, various minor changes and modifications of the present invention are possible in the light of the above teaching. It is therefore to be understood that within the scope of the appended claims, the present invention may be practiced otherwise than as specifically described.

What is claimed is:

1. A power transmitting silent chain apparatus comprising:

a silent chain comprised of a plurality of link plates interconnected by connector pins, each link plate having a pair of teeth; and a sprocket having a plurality of involute teeth for meshing with said link plate teeth,
      said link plate teeth having inner and outer flanks being profiled to satisfy the expression $$Hi=Ho+Hs$$

where Hi is a distance from a pitch line of said chain to a pitch line of said inner flanks, Ho is a distance from said chain pitch line to a pitch line of said outer flanks, and Hs is an amplitude of a polygonal motion of said chain, wherein the chain pitch line represents a pin-to-pin distance of a link plate, the inne pitch line represents a line passing parallel to the chain pitch line over the inner flanks at first two points where the distance between the first two points becomes ½ of the pin-to-pin distance, the outer flank pitch line represents a line passing parallel to the chain pitch line over the outer flanks at second two points where the distance between the second two points becomes ⅔ of the pin-to-pin distance.

2. A power transmitting silent chain apparatus according to claim 1, wherein said link plates have engaging surfaces processed by shaving and having a shear plane length of more than 70% of the thickness of the link plates.

3. A power transmitting silent chain apparatus according to claim 1, wherein said link plates have engaging surfaces processed by fine-blanking and having a shear plane length of more than 70% of the thickness of the link plate.

4. A power transmitting silent chain apparatus according to claim 1, wherein each of said connector pins comprises either one of a round pin and a locker pin.

\* \* \* \* \*